Figure 1:
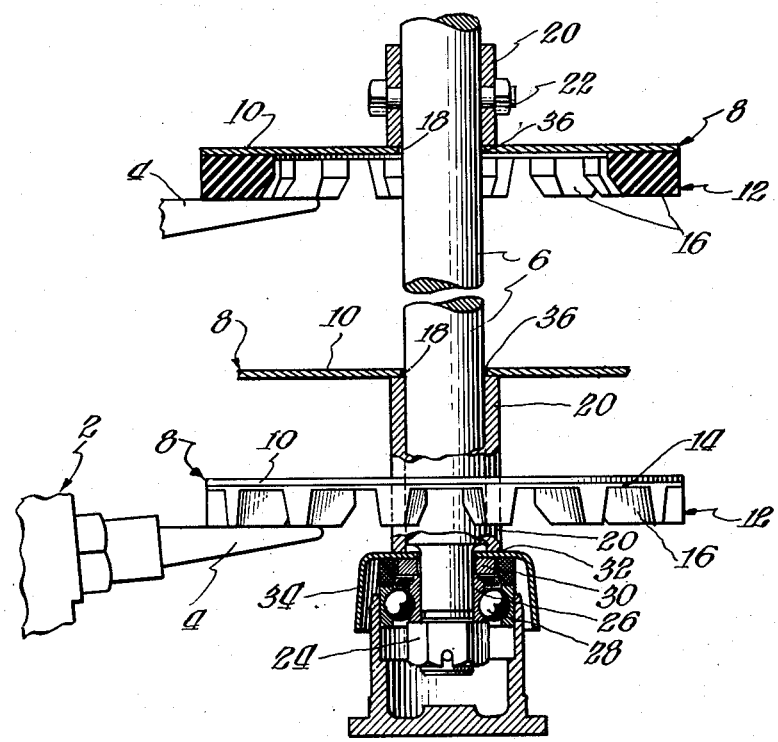

Oct. 6, 1953     L. P. MILLARD     2,654,202

COTTON PICKER DOFFER ASSEMBLY

Filed Feb. 17, 1951

Inventor:
Lee P. Millard
By: Paul O. Pippel
Attorney.

Patented Oct. 6, 1953

2,654,202

UNITED STATES PATENT OFFICE 2,654,202

COTTON PICKER DOFFER ASSEMBLY

Lee P. Millard, Chicago, Ill., assignor to International Harvester Company, a corporation of New Jersey Application February 17, 1951, Serial No. 211,463

3 Claims. (Cl. 56—41)

This invention relates to cotton pickers of the type shown in United States Johnston Patent 2,140,631 issued December 20, 1938 and more particularly to an improvement in the doffing means thereof.

Cotton pickers of this class embody a plurality of spindles arranged for systematic insertion into a cotton plant, the spindles rotating to entwine or snag cotton thereon, and then being withdrawn from the plant and advanced to a doffer station whereat means are employed to remove the lint from each spindle.

The present invention is concerned with an arrangement wherein the doffing means comprises a plurality of vertically spaced disc assemblies, each assembly cooperating with a plurality of substantially horizontally aligned spindles which move thereunder, the assemblies functioning to brush or sweep the cotton off the laden spindles.

Current constructions utilize vertical bars each of which carry a plurality of equally spaced vertically aligned spindles. The intent is to position these bars, which make up the picker drum, in such manner as to obtain horizontal alignment of corresponding spindles on the respective bars to form horizontal rows of spindles, each row cooperating with a separate doffer disc. It will be readily appreciated however, that perfect horizontal alignment of all of the spindles in a row cannot be realized in practical embodiments wherein due consideration to costs must be given, and that variations arising from uneven wear, manufacturing tolerances, inexact adjustment or assembly etc., are the usual order. It will be further understood, that even if perfect horizontal alignment were achieved, the crop would not distribute evenly on all of the spindles so that their presentation to the doffers would not be uniform.

All of these factors heretofore directed a compromise adjustment of the doffer assemblies at the discretion of the mechanic or operator to determine the average condition. Such average condition is of course theoretical and cannot provide a satisfactory criterion for adjustment, and is obviously inherently undesirable. It has been found in actual practice that the operator is not particularly concerned with fine increments of adjustment but merely locates the doffers as low as possible. This not only accelerates wear of the doffers, the spindles and the cooperating parts, but also under proper conditions imposes heavy breaking stresses thereon. Furthermore, the mechanism works inefficiently with increased power consumption.

A general object of the invention is to provide an automatically self-adjusting doffer assembly, the action of which is correlated to the exact condition presented.

More particularly, the invention contemplates a doffer mechanism including a plurality of discs each of which functions with a particular row of spindles and is individually adjustable to meet the specific condition encountered.

A specific object of the invention is to provide a doffer comprising a flexible structure in the form of a thin sheet steel disc with doffing pads secured thereto, the disc being yieldable to accommodate the constantly varying conditions.

A further object is to devise a doffer disc which may be simply and economically manufactured.

Another object is to provide a disc cheap enough to be expendible so that it may be discarded when the pads become worn.

A different object is to mount the discs in a novel manner which will assist flexing of the discs.

A still further object is to provide a simple slip mounting of the discs with spacers therebetween on the driving shaft, the discs being normally held to rotate with the shaft but being capable of slipping under usual conditions such as may otherwise cause breakage of the parts.

Figure 2:
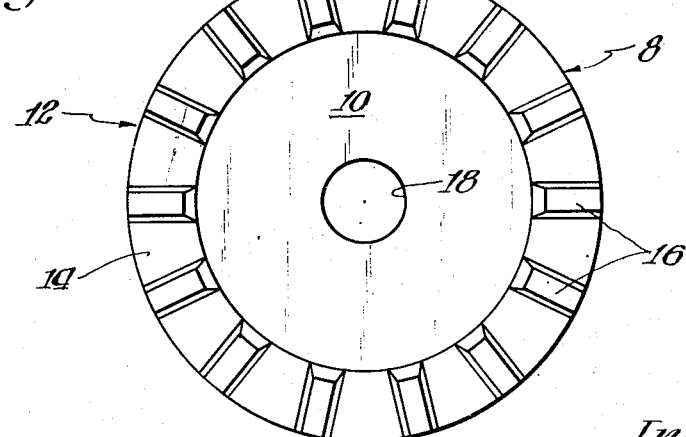

These and other objects of the invention will become more apparent from the specification and drawings wherein:

Figure 1 shows a portion of a picker drum structure with parts omitted and a doffing mechanism associated therewith, portions of the doffing structure being shown in vertical cross section, and Figure 2 is a bottom plan view of one of the doffer discs.

Describing the invention in detail, the structure generally indicated 2, represents a carrier member for rotatable spindles 4. This structure may be of any type but is preferably such as shown in the United States patent issued to E. A. Johnston Patent No. 2,140,631. A plurality of the supports 2, which in fact are vertically arranged bars, are mounted on a supporting structure and carry a plurality of vertically spaced spindles or picking elements 4 which are moved past the doffer structure during operation of the picker.

Inasmuch as the invention resides in the doffer mechanism, only limited parts of the picker construction have been shown as are necessary to illustrate the invention.

The doffer mechanism consists essentially of a vertical shaft or driving member 6 mounted for rotation at proper relative speed with respect to the movement and rotation of the spindles 4, as shown and described in the before mentioned Johnston patent. For each horizontal row of spindles 4, a separate doffer mechanism is provided.

Each doffing mechanism assembly or element, generally indicated 8, comprises a flat annular plate 10 formed of a suitable flexible material which restores itself to its original shape after the distorting force is removed. The disc or plate 10 is preferably formed of flat sheet steel of between eleven and sixteen guage.

The disc is provided on one side thereof with a resilient doffing element, generally indicated, 12. The element 12 is formed of material such as natural or synthetic rubber and comprises an annulus or ring 14 located adjacent to the outer periphery of disc 10 and has an outer edge which coincides with the outer margin of the disc 10. The annulus 12 is bonded or vulcanized or united at one or obverse side to the plate 10 and has on its opposite or reverse side a plurality of integral circumferentially spaced axially extended projections or doffer members or lugs 16,16 which are tapered in cross section and are generally apical in shape. It will be seen from a consideration of Figure 2 that the annulus 14 is located adjacent to the outer periphery of the plate 10 and has its inner margin spaced a substantial distance from the axial center, circular mounting opening 18 of the disc.

Referring now to Figure 1, it will be noted that the doffers 8 are stacked vertically on the shaft 6, the shaft extending through the openings 18 in the respective discs 10 and the discs being suitably spaced by means of spacers or sleeves 20 disposed between or at opposite sides of the discs and in abutment therewith. The uppermost sleeve 20 or abutment means is secured to the shaft 6 by a bolt and nut assembly 22 and the discs and sleeves are tightly frictionally engaged by being tightened axially by a nut 24 which is threaded on the lower end of the shaft 6. This provides a rotatable slip mounting for the doffer elements or discs. In the present embodiment, the nut or abutment means 24 acts against an inner race 26 of a bearing assembly 28, the race 26 abutting a washer 30 which in turn bears against an inturned flange 32 of a dust cap 34, the flange 32 abutting against the lower edge of the lower-most sleeve 20.

In order to facilitate flexing of the plates 10 the openings 18 therein are made about one-sixty-fourth of an inch larger in diameter than the thickness of the shaft 6. Thus during flexing of the plate 10, resistance thereto, is offered by the material composing the disc and by the clamping action of the sleeves 20 above and below the same. The clearance, which is exaggerated in Figure 1 and shown at 36, eliminates any tendency for the inner periphery of the disc to dig into the shaft 6, and thus restrain its flexing. The sleeves or tubes 20 are relatively thin and merely pinch the plates adjacent to their inner peripheries so as to offer minimum resistance to flexing of the discs. The discs may, under predetermined load, rotate slightly about the shaft to prevent breakage. This is possible inasmuch as there is only frictional engagement between the discs and sleeves.

In actual practice, these discs have performed well and have been definitely observed moving with an undulating effect, thus providing an adjustable doffing attitude concomitant with the specific position of each spindle and the amount of crop thereon. The flexibility of the discs 10 also materially reduces stress on the parts and considerably prolongs the life thereof. The necessity of frequent adjustment is also precluded. The inherent resiliency in each disc permits adjustment of the doffers in a position whereat they may be set with their members 16 in close proximity to, but out of contact or light contact with the peripheries of the spindles in the associated row. This provides an effective doffing relationship which materially prolongs the life of the spindles and the members 16 by reducing abrasion therebetween.

The thinness of the discs also provides better clearance conditions between the discs and the spindles and permits spacing the spindles closer together or forming the rubber-like doffer elements thicker for longer wear.

What is claimed is:

1. A doffer for a cotton picker of the type described comprising a thin, resilient, annular plate and doffer means carried thereby and comprising an annulus having a bonded connection to one side of the plate at the outer periphery thereof, and axially projecting doffing lugs integral with said annulus, said doffer means being formed of rubber-like material.

2. A doffer for a cotton picker of the type described comprising a thin, resilient, annular sheet steel plate and doffer means carried thereby and comprising an annulus having a bonded connection to one side of the plate at the outer periphery thereof, and axially projecting doffing lugs integral with said annulus, said doffer means being formed of rubber-like material.

3. A doffer for a cotton picker of the type described comprising a thin, resilient, annular plate and doffer means carried thereby and comprising an annulus having a bonded connection to one side of the plate at the outer periphery thereof, and axially projecting doffing lugs integral with said annulus, said doffer means being formed of rubber-like material, said plate having a center circular opening, a cylindrical shaft extending through the opening, means including sleeves on the shaft at opposite sides of the plate in tight clamping engagement therewith and affording a frictional connection between the shaft and the plate, said sleeves being radially thin and engaging said plate only about said opening for minimum resistance to flexing of the plate.

LEE P. MILLARD.

References Cited in the file of this patent

UNITED STATES PATENTS

| Number | Name | Date |
| --- | --- | --- |
| 423,541 | Todd | Mar. 18, 1890 |
| 798,651 | Appleby | Sept. 5, 1905 |
| 1,668,247 | Morava | May 1, 1928 |
| 1,802,022 | Johnston et al. | Apr. 21, 1931 |
| 1,828,534 | Johnston et al. | Oct. 20, 1931 |
| 2,140,631 | Johnston | Dec. 20, 1938 |
| 2,247,682 | Hagen | July 1, 1941 |
| 2,247,686 | Johnston | July 1, 1941 |
| 2,462,800 | Berry | Feb. 22, 1949 |